March 27, 1956 J. C. TELLIER 2,740,046

SIGNAL CONTROL CIRCUITS

Filed Nov. 25, 1950 2 Sheets-Sheet 1

INVENTOR.
JOSEPH C. TELLIER
BY
Allen V. Hazeltine
ATTORNEY

March 27, 1956 J. C. TELLIER 2,740,046

SIGNAL CONTROL CIRCUITS

Filed Nov. 25, 1950 2 Sheets-Sheet 2

INVENTOR.
JOSEPH C. TELLIER
BY
[signature]
ATTORNEY 2,740,046

SIGNAL CONTROL CIRCUIT

Joseph C. Tellier, Penn Wynne, Pa., assignor to Philco Corporation, Philadelphia, Pa., a corporation of Pennsylvania Application November 25, 1950, Serial No. 197,551

8 Claims. (Cl. 250—36)

Figure 1:
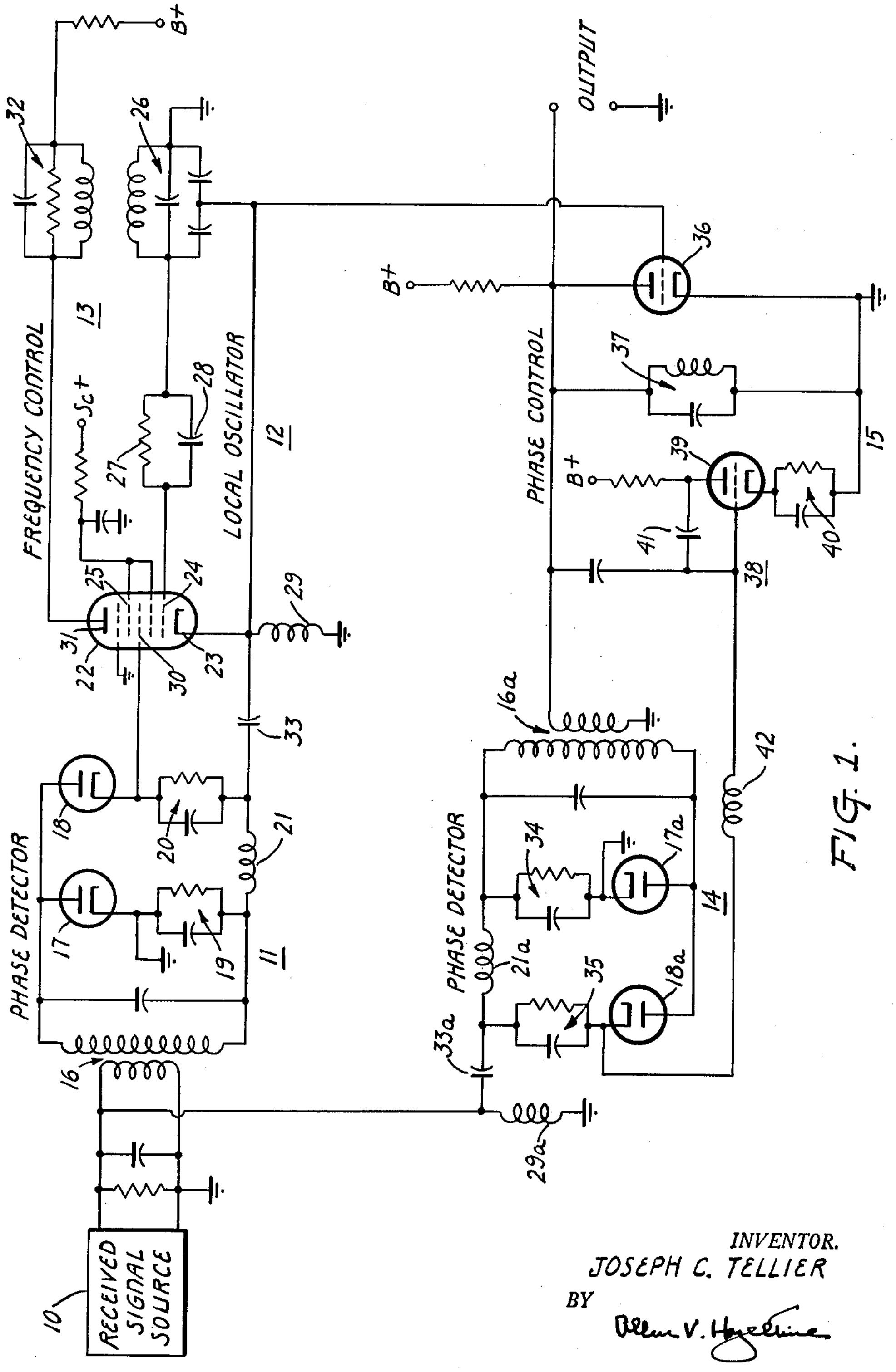

The present invention relates to electrical circuits which are adapted to maintain a locally generated signal in exact synchronism with an externally supplied signal. More particularly it relates to circuits for effecting synchronization between a local oscillator and each of a series of time-spaced oscillatory signals and for maintaining the frequency and phase of the local oscillations substantially constant during the intervals between the successive oscillatory signals of the series.

Circuits of this general nature find perhaps their widest field of application in television receivers, where they serve to maintain that high degree of synchronism between the occurrence of certain phenomena at the transmitter and at the receiver, which is required to assure faithful reproduction of a televised image. Such circuits are provided to sense the reception of horizontal or vertical sweep synchronizing pulses, for example, and to respond thereto by initiating corresponding sweep traversals in the receiver. Again such circuits come into play when it is necessary to sample color coded picture information contained in the received signal. In this case it is extremely important that the picture signal be supplied to a particular color reproduction device exactly at the time when the signal is representative of the color to be reproduced by that device. In one system of color television, there is incorporated, in the transmitted signal, a short, periodically recurrent signal burst of a frequency corresponding to the rate of change of color information. It is then the purpose of the circuits under consideration to insure that an oscillator, incorporated in the receiver, shall operate in precise synchronism with the signals of which the aforesaid bursts are composed.

It has heretofore been attempted to achieve this synchronism between received and locally generated signals by the provision of a so-called automatic frequency control system at the receiver. Numerous specific embodiments of such frequency control systems are well known in the art and therefore do not require detailed description here. However, a brief review of the operational characteristics which they all have in common will be useful in demonstrating their applicability to certain of the specialized problems hereinbefore briefly discussed which are encountered in the sampling of color television signals.

Generally speaking, the operation of prior art automatic frequency control systems is predicated upon the fact that some indication of the relative frequencies of two signals may be obtained by observing their relative phases, that is, their phase difference. More specifically, it is apparent that, when two signals are at the same frequency, their phase difference is constant. In prior art arrangements, there was provided a phase detector which measured the phase difference between a received signal and a locally generated signal and which provided an output voltage proportional thereto. A control circuit received the output voltage of the phase detector, this control circuit being so arranged that, when the output voltage had a constant predetermined value, denoting equal frequency of the two signals at predetermined phase difference, it exerted no frequency control on the local oscillator and permitted the latter to run at its preset frequency and phase. The control circuit was, however, operative to change the oscillator frequency in proportion to changes in the absolute value of the phase detector output voltage. This latter would, in normal operation, change for one or both of two reasons. First, it would change if the received signal frequency changed and remained at a changed value. So long as this condition prevailed, the phase detector output voltage must, of course, also remain changed if the local oscillator frequency was to remain properly synchronized with the received signal frequency. The only way in which this changed phase detector output voltage could be maintained was by establishing a new constant phase difference between the received signal and the locally generated signal which was different from the original constant phase difference. Secondly, while the long time average frequency of the received signal might remain constant, its phase might still vary from time to time. Such phase changes will, of course, also be sensed by the phase detector which will respond by changing its output voltage. The control circuit will interpret this change in phase detector output voltage as calling for a change in the frequency of the locally generated signal. The local oscillator will therefore produce a signal of incorrect frequency, which will in turn produce a varying phase difference to which the phase detector will respond by supplying the control circuit with a varying corrective voltage. This latter will produce a varying compensatory oscillator frequency change, so that the oscillator will be caused to hunt about its proper frequency value, eventually returning to its proper average frequency, but not until its phase, relative to the phase of the received signal, has departed from their initial relationship for a considerable period.

From the foregoing discussion, it is clear that prior art automatic frequency control systems were able to maintain the long time average frequency of locally generated signals equal to that of received signals, while suffering their instantaneous phase differences to undergo wide variations. Naturally, if the locally generated signal, as here contemplated, is to be used for color sampling of a television signal at periodic intervals determined by a received signal, it is essential that the locally generated signal be synchronized with the received signal in phase as well as in frequency.

It is, accordingly, a principal object of the invention to provide a circuit which is adapted to maintain a locally generated signal in complete synchronism with a received signal.

It is another object of the invention to provide a circuit which is adapted to maintain both frequency and phase synchronism between a locally generated signal and a received signal.

It is still another object of the invention to provide a circuit, in a color television receiver, which will maintain a locally generated color sampling signal in absolute instantaneous synchronism with a received color sampling signal in spite of relatively rapid phase variations in the latter.

To the foregoing general ends there are provided, in a circuit constructed in accordance with the invention, means for controlling the long time average frequency of the locally generated signal so as to maintain the same equal to the long time average frequency of a received signal. It is within the contemplation of my invention that this average frequency control be effected either by a unidirectional potential proportional to the average phase difference between the received and the locally generated signal, as in a phase detector frequency control system, or by direct injection of the received signal into the source of locally generated signal, as in a locked oscillator frequency control system. There is further provided, in accordance with the invention, a phase detector for comparing the phase of the locally generated signal, whose long time average frequency has previously been controlled in accordance with that of the received signal, with the phase of the received signal, to produce an output voltage proportional to the instantaneous phase difference therebetween, and means for modifying the instantaneous phase of the locally generated signal in accordance with this output voltage without affecting its long time average frequency which latter remains as previously determined by the received signal. It is a feature of such an arrangement that it permits the use of a type of automatic frequency control system which is substantially immune to noise in the received signal. Furthermore, as will be seen, the nature of the rapid phase changes which the externally supplied signal may undergo and for which my novel circuit arrangement compensates, is such as to allow the use of a phase control arrangement which is also substantially unresponsive to such noise as commonly affects television signals.

Figure 2:
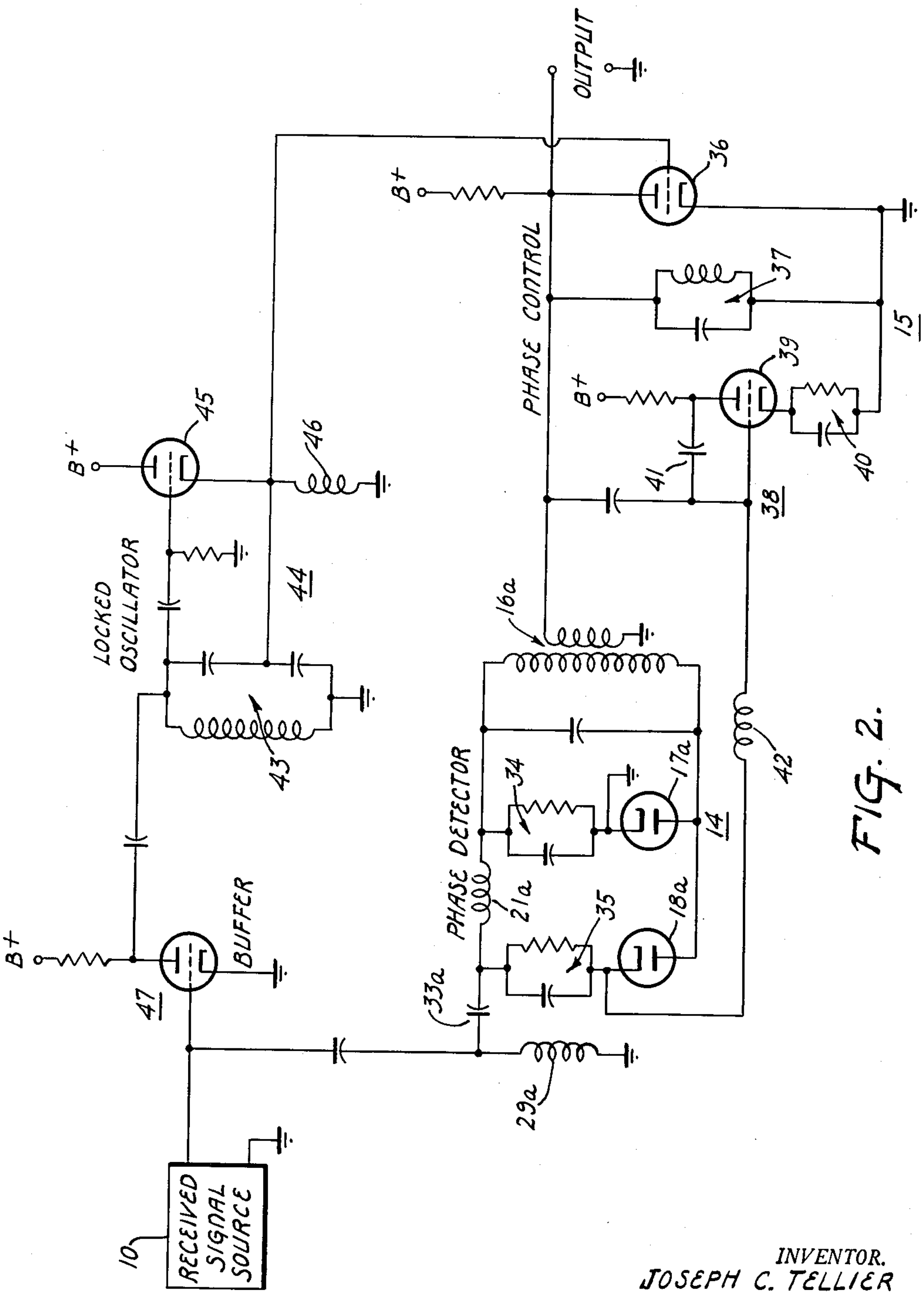

The various features and operational characteristics of apparatus embodying my invention will be more readily understood from the subsequent detailed description and accompanying drawings wherein Figure 1 shows a synchronizing system constructed in accordance with the invention and using a phase detector-controlled local oscillator; and Figure 2 shows a synchronizing system similar to that of Figure 1, but using a locked local oscillator.

The major operating units into which the apparatus illustrated in Figure 1 is divided for convenient description and analysis comprise a source of received signals 10, a first phase detector 11, a local oscillator 12, a frequency control circuit 13, a second phase detector 14 and a phase control device 15. From the following discussion it will be apparent that my invention resides primarily in the novel combination of these major operating units to provide a new and useful result, rather than in the detailed structure of the units themselves, and it will likewise be apparent that these units may be altered or replaced by other specific arrangements adapted to perform substantially the same functions, as will readily occur to those skilled in the art. Proceeding now to a consideration of the arrangements specifically disclosed, the source 10 of received signals may, in the case of a color television receiver, comprise all of the receiver stages which precede the color sampling oscillator stage and specifically may include a color burst separating stage in which the color burst, which, as hereinbefore mentioned, is indicative of the rate of change of color information in the picture signal, is separated from the remaining components of the composite signal.

As is well known, a typical composite television signal comprises video signals, horizontal synchronizing pulses, cyclically recurrent at the horizontal scanning frequency, and blanking signals upon which the synchronizing pulses are pedestaled so as to insure that the scanning retrace lines will not become visible upon the receiver viewing tube screen. In accordance with present operating standards, the synchronizing pulses occupy only one-half the space atop each blanking pedestal. Furthermore, each synchronizing pulse occurs almost immediately after the beginning of the blanked interval so that nearly one-half of the trailing portion of the blanking pedestal is unoccupied. This trailing portion is often referred to as the "back porch" of the blanking pedestal and it is upon this back porch that the color burst is ordinarily superimposed. Each burst consists of an odd number of half cycles of an oscillatory signal whose frequency equals the rate of change of color information, or 3.58 megacycles in the present case. This oscillation has, as its maximum excursion limits, the black level of the blanking signal and the peak of the synchronizing signal. In many cases, such color bursts can readily be separated from the remainder of the composite signal by simply passing the latter through a narrow band pass filter transmissive of 3.58 megacycle signals. Such a separator stage may, if necessary, be followed by one or more stages of amplification, after which the now isolated color sampling bursts are supplied to one input circuit of phase detector 11 via the mutual inductive coupling which exists between the primary and secondary windings of its tuned input transformer 16. A typical nominal value of the signal frequency of a color sampling burst, as used in presently contemplated color television systems, is 3.58 megacycles and it is to this frequency that the secondary winding of transformer 16 is tuned. In this connection, specific attention is invited to the fact that the color sampling signal is not received continuously, but only in periodically recurrent bursts. It will be seen that this characteristic of the color sampling signal has an important bearing on several aspects, to be discussed in detail, of apparatus embodying my inventive concept.

In addition to the input circuit which includes the tuned secondary winding of transformer 16, phase detector 11 also includes a pair of diodes 17 and 18, whose anodes are jointly connected to one end of the secondary winding of transformer 16. The cathode of diode 17 is grounded and is also connected by way of parallel resistance-capacitance (R-C) network 19 to the other end of the secondary winding of transformer 16. The cathode of diode 18, on the other hand, is connected to another parallel R-C network 20, the latter being returned to the aforesaid other end of the transformer secondary winding via radio frequency choke 21.

Locally generated signals which are to be phase-compared with received signals in phase detector 11 are derived from a local oscillator 12. This latter comprises, in the preferred form illustrated, a multi-grid vacuum tube 22 of which the cathode 23, control grid 24 and screen grid 25 perform the functions of an ordinary oscillator triode. Combined therewith is a tank circuit 26, a grid leak resistor 27 and a grid leak by-pass capacitor 28. The junction of the two series tank circuit capacitors is returned to the cathode 23 of tube 22, this cathode, in turn, being connected to ground by way of a radio frequency choke 29.

The frequency control portion of my system is completed by frequency control circuit 13 which also includes multi-grid vacuum tube 22, of which the cathode 23, control grid 30 and anode 31 are principally active in the role of oscillator frequency control device. Associated with the control portion of tube 22 is a radio frequency output circuit comprising the anode 31 and the resonant plate circuit 32.

Received signals appearing across the secondary winding of transformer 16 follow a pair of parallel paths through the phase detector, one of which comprises diode 17 and the R-C network 19 connected thereto, while the other one includes diode 18, its associated R-C network 20, D.-C. blocking capacitor 33, choke 29, ground and R-C network 19. Since both diodes 17 and 18 are similarly poled with respect to the incoming signal (that is, similar electrodes are connected to one end of the tuned input circuit), this signal, in its positive swing, will cause each diode to conduct and develop a unidirectional potential across its associated R-C network. By proper selection of the time constants of the R-C networks, the unidirectional potentials thus developed will be caused to reach values roughly equal to the applied signal voltage and having the same polarity. It is noted that the two R-C networks 19 and 20 are connected in a series circuit including choke 21 between grid 30 of tube 26 and ground, and therefore the algebraic sum of the voltages developed across these R-C networks is applied between the grid and cathode of tube 22. Because the negative terminals of these R-C networks are connected together (through choke 21 which has negligible impedance at the low frequency involved), the potential developed across one will cancel that developed across the other and, since they are developed in response to the same signal voltage, their cancellation will be complete for all practical purposes.

When the local oscillator 12 is in operation, its output signal is derived from tank circuit 26 and developed across choke 29 which connects cathode 23 to ground. It is thence applied to phase detector 11 by way of its second input circuit which includes capacitor 33, R-C network 20, diode 18, the tuned input circuit of the phase detector, R-C network 19 and ground. Choke 21 is provided for the purpose of preventing the capacitor of R-C network 19 from directly shorting to ground the oscillator signal developed across choke 29. So far as the oscillator signal is concerned, diodes 17 and 18 are connected back-to-back, with the result that virtually no conduction of diode 17 will take place due to the oscillator signal. Should some such conduction take place, however, the current flowing through the diode during such conduction will be incapable of developing any corresponding potential across the associated R-C network 19 because of the intervening ground connection which effectively isolates diode 17 from R-C network 19 for oscillator signals. On the other hand, current will flow through diode 18 in response to the oscillator signal and a unidirectional potential proportional to the amplitude of this signal will be developed across R-C network 20.

Thus, both the incoming signal and the oscillator signal cause current flow through R-C network 20. Consequently, across R-C network 20, a unidirectional potential is developed in response both to the incoming signal and the oscillator signal, which is proportional to the vector sum of these two signals and whole amplitude varies with the instaneous phase difference therebetween. Local oscillator 12 is preferably so adjusted, by tuning of its tank circuit 26, that its operating frequency is equal to the nominal frequency of the received color sampling signal or, in the present example 3.58 megacycles. It is also necessary that the undeviated oscillator signal be in phase quadrature relation with the input signal. This phase relation is maintained by means of the R-F control voltage supplied to the oscillator by way of a quadrature circuit which, in this instance, comprises the resonant circuit 32 inductively coupled to the oscillator tank circuit 26.

Needless to say, the local oscillator and received signal source connections to the phase detector 11 may be interchanged, if desired, without deleteriously affecting the operation of the phase detector. The reason for adopting the particular connections shown is that they render the phase detector unresponsive to amplitude modulation of the received signal. For a full and detailed explanation of this feature of the phase detector connection herein described, reference may be had to copending U. S. patent application, Serial No. 102,882, filed July 2, 1949, in the name of Albert R. Alter and myself, as joint inventors.

It has previously been indicated that one factor which governs the selection of the time constants of the R-C networks 19 and 20 of the phase detector is the requirement that they be sufficiently long so that unidirectional potentials developed across them will reach values roughly equal to the applied signal voltage. An additional factor which influences the selection of these time constants is the desire to reject noise which may appear in the received signal so that the noise will be unable to affect the frequency of the local oscillator signal which the phase detector output determines. Fortunately, these two requirements are easily reconciled, for noise which affects signals of the high frequencies involved is, ordinarily, of such short duration that its order of magnitude is approximately the same as one period of the color sampling signal. If there is to be developed, across the R-C networks, a unidirectional potential of a value roughly equal to the amplitude of the applied sampling signal, then their time constants will, of necessity, have to be very much longer than one period of these sampling signals and, therefore, also much longer than the duration of common noise pulses. As has further been pointed out, herein, the received color sampling signals occur in bursts of short duration with relatively long intervals between consecutive bursts. For example, it has been explained that in presently contemplated television systems, the color sampling burst is transmitted by superimposing it on the so-called back porch of the blanking pulse. This sampling burst will therefore be present only for approximately 4 percent of the transmission time. Since it is, obviously, desired to have the local oscillator maintain its proper synchronized frequency during the 96 percent of the total transmission time during which no received color sampling signals are present, it will be necessary to make the time constants of the phase detector R-C networks so great that virtually no change in the unidirectional voltage developed thereacross will take place during the intentional absence of received signals. In presently contemplated systems, these color bursts recur once during each line swept out by the receiver tube electron beam in tracing its image constituting pattern. Therefore this time constant will have to be equal to several of the intervals required to scan each such line and will preferably be much greater. In fact, the long time average frequency variations which may occur at the transmitter, and which this frequency control system is intended to follow, are, almost invariably, so slow that the time constant of the R-C networks under discussion may safely be made equal to the time required for the electron beam to trace out several complete pictures. This will, incidentally, have the additional beneficial effect of rendering the frequency control portion of the system immune to noise even in the unlikely event that this noise should persist for a considerable length of time.

Needless to say, the capacitors of each R-C network should further be sufficiently large to by-pass signals of the received signal frequency.

Typical values which the components of each R-C networks 19 and 20 may have to fulfill their functions as hereinbefore outlined are:

| | |
|---|---|
| Resistors | 1 megohm each. |
| Capacitors | 0.1 microfarad each. |

With such values, the time constant of the phase detector output circuit is one tenth of a second.

Having shown how the frequency control portion of my system operates to produce a continuous output signal, locally generated in oscillator 12 and of long time average frequency substantially equal to that of the intermittent received signal, irrespective of noise or other temporary disturbances which may occur in the latter, I now proceed to the detailed description of the preferred embodiment of the phase control portion of my system, which is illustrated in the drawing. As has been generally indicated before, this portion of the system consists principally of phase detector 14 and phase control circuit 15. Of these, phase detector 14 may be generally similar to phase detector 11. Accordingly, like portions of the two circuits have been designated by similar reference numerals for ease of comparative identification. Thus, phase detector 14 is provided with an input transformer 16a having tuned secondary winding, a pair of diodes 17a and 18a, a choke 21a, a D. C. blocking capacitor 33a. The cathodes of diodes 17a and 18a are again connected to parallel R–C networks in a manner similar to that of phase detector 11. However, since the selection of the time constants of these R–C networks is now governed by different considerations, they are identified by different reference numerals, namely 34 and 35, respectively.

Furthermore, phase detector 14 is also supplied with both locally generated and received signals for phase comparison therein, but the input circuits to which these signals are respectively supplied are interchanged as compared with those of phase detector 11. The reason for this modification is closely related to my inventive concept and is, therefore, discussed in detail hereinafter.

The phase control circuit consists principally of an amplifier tube 36 having a parallel resonant circuit 37 in its anode-to-cathode output circuit. This anode-to-cathode output circuit of amplifier tube 36 is further connected to one input circuit of phase detector 14 via the primary winding of its input transformer 16. Resonant circuit 37 is still further connected to a so-called Miller type amplifier 38, which latter is a well known type of circuit consisting of an amplifier tube 39, self-biased and by-passed to ground through R–C network 40 and having capacitance between its input control grid electrode and its current collecting anode. This capacitance may be provided either by distributed inter-electrode capacitance within the tube or, if that be not sufficient, by an additional external capacitor 41. The input control grid electrode of this Miller amplifier is further connected, by way of a high frequency choke coil 42, to the output terminal of the phase detector 14, this being the junction point between the cathode of diode 18*a* and R–C network 35. It remains to note that received signals, also derived from received signal source 10, are applied to the other input circuit of phase detector 14, by way of D. C. blocking capacitor 33*a* and a grounded choke coil 29*a* similar to choke 29 across which the local oscillator output is supplied to phase detector 11, and at the same time that they are applied to phase detector 11. Having previously described how signals derived from local oscillator 12 are applied to the remaining input circuit of phase detector 14, it will be apparent that, by analogy with the fully explained operation of phase detector 11, phase detector 14 will produce a unidirectional output voltage, between ground and the junction of the cathode of diode 18*a* and its associated R–C network 35, which is proportional to the instantaneous phase difference between the local oscillator signal and the received signal. By virtue of the circuit connection hereinbefore described, this unidirectional potential is applied to the control grid of tube 39 of the Miller type amplifier 38. It is well known that the effective input capacitance—that is the capacitance between the input control grid electrode and the cathode—of such a Miller type amplifier varies in accordance with the grid bias of the amplifier tube. Consequently, variations in the unidirectional output potential of phase detector 14, produced by changes in the phase relation between the local oscillator and the received signal, will produce corresponding variations in the input capacitance of the Miller type amplifier 38.

As has been previously explained, the input control grid electrode of tube 39 is directly connected to resonant circuit 37 so that the input capacitance of tube 39 is actually in shunt therewith. Accordingly, variations in this input capacitance, produced by variations in the unidirectional output potential of phase detector 14, as hereinbefore explained, will change the tuning of resonant circuit 37. In accordance with the invention, this resonant circuit is so adjusted that the unidirectional bias potential derived from the output of phase detector 14, when the local oscillator and the received signals are in quadrature relation, is of such value as to produce an input capacitance, for the Miller type amplifier tube 39, which cooperates with tuned circuit 37 to tune it to the undeviated frequency of the local oscillator, for example 3.58 megacycles.

Observe now that locally generated signals derived from oscillator 12 will appear on the anode of amplifier tube 36 and will consequently also excite corresponding alternating signals in resonant circuit 37. These signals excited in resonant circuit 37 will, of course, be at exactly the same frequency as those produced by the oscillator since the phase control circuit is non-regenerative. So long as the desired quadrature relation between the phase of the locally generated signals and the received signals is maintained, resonant circuit 37 will be tuned to the same frequency as locally generated signals which appear thereacross. It will, therefore, present a resistive impedance to the latter and will leave their phase totally unaffected. However, should the phase of the received signals vary for any of various previously mentioned reasons, then the phase detector output voltage will also vary in proportion to the phase deviation of the received signal. This will result in a change of the Miller type amplifier tube bias which in turn will modify the tuning of resonant circuit 37 so that the latter will no longer be tuned to the frequency of the locally generated signals. The Q of resonant circuit 37 is preferably made very high so as to maximize the amount by which the circuit changes the phase of signals which are not at its resonant frequency. Then, by appropriate changing of the circuit's resonant frequency, accomplished by varying the unidirectional output voltage of phase detector 14 in response to phase variations in the received signal, the phase of the local oscillator signals developed thereacross will be proportionately modified.

Under most common circumstances, phase variations of the received signal, which it is desired to reproduce in the locally generated signal, attain troublesome proportions only over periods of a few line intervals. Noise impulses, on the other hand, against which it is desired to discriminate, occur, ordinarily, at a much higher rate. It is, therefore, important that the effective time constant of the phase detector output circuit be of the order of magnitude of the time required by the receiver electron beam to trace a few lines of its complete raster. For, if this time constant were much shorter, then it would permit the unidirectional phase detector output voltage to vary considerably in response to noise, whereas, if it were much longer, then the phase detector output voltage could not follow variations in the phase of the received signal, with resultant dephasing of the locally generated signals with respect to the received signal. Note that the time constant of the output circuit of phase detector 14 has been characterized, in the immediately preceding passage, as the "effective" time constant of this circuit. This is due to the fact that the time constant which governs the rapidity of output voltage variations in the output circuit of phase detector 14 is not, as was the case with phase detector 11, determined solely by the resistance and capacitance of its R-C networks 34 and 35. It may, in fact, be shown mathematically—and this has been verified experimentally—that the effective time constant of the output circuit of phase detector 14 when connected to phase control circuit 15 in the manner hereinbefore described is given by the expression:

$$\text{Effective time constant} = \frac{RC}{1 + K_1 K_2}$$

where RC is the product of the actual resistance and capacitance of R-C networs 34 and 35 or, in other words, the actual time constant of the phase detector output circuit, $K_1$ is the ratio of voltage output from the phase detector, to phase difference between the received and the locally generated signals, and $K_2$ is the ratio of phase difference between received and locally generated signals to corrective voltage output of the Miller type amplifier circuit 38.

Observe now that by arranging the various circuit elements in such a manner that the ratios defined by $K_1$ and $K_2$ are both large, then the effective time constant of the phase detector output circuit will be very much smaller than its actual time constant as determined by the resistance and capacitance of R-C networks 34 and 35. This is an essential feature of my invention, the effect of which is to overcome an otherwise insurmountable obstacle to the full realization of its objects.

It has already been demonstrated that the effective time constants of the phase detector output circuit should be of the order of magnitude of a few line intervals. It has also been explained that the color sampling bursts which constitute the received signal of my system are present for only a very short portion of such a line interval. While each color burst persists, the phase detector will be operating in the normal manner to produce a unidirectional output voltage proportional to any phase error which may exist between the received and the locally generated signals. To this the phase control circuit will respond by modifying the phase of the locally generated signal to accord with that of the color burst. From the detailed description of the operation of phase detector 11, it will be recalled that received signals alone, in the absence of locally generated signals, would have produced no net output voltage from the phase detector. In phase detector 14, now under consideration, locally generated signals are supplied to the same input circuit to which the received signals were supplied in phase detector 11. By analogy, then, locally generated signals alone will produce no net output voltage from phase detector 14. Therefore, as soon as the color burst ceases, the output voltage of phase detector 14 will fall to zero. This, however, will not be the case with the control voltage supplied to tube 39, since the latter is constituted of the sum of the voltages on the capacitors of R-C networks 34 and 35. On the contrary, the rate of decrease of this control output voltage is now governed only by the actual time constant of those phase detector R-C networks.

Reference to Equation 1, above, shows that this actual time constant is very much longer than the effective time constant which controls during each color burst, and which has been stated to be of the order of magnitude of a few line intervals. Since the effective time constant of the network, in the absence of a color sampling burst, is thus many times greater than a line interval, the phase detector output voltage will remain substantially unchanged between successive color sampling bursts but will regain its short effective time constant, and with it its rapid control of the locally generated signal phase during periods when the color sampling burst is actually being received.

This result checks with the terms of Equation 1 since $K_1$ is zero when the output voltage of phase detector 14 is zero, so that the effective time constant of the phase detector output circuit has the value RC in the absence of a received signal.

This being the case, the components of R-C networks 34 and 35 may typically be chosen with the same values as those of R-C networks 19 and 20, which are 1 megohm for each resistor and 0.1 microfarad for each capacitor. This will yield an actual time constant of 0.1 second for the output circuit of the phase detector, while the effective time constant during periods of signal burst reception may well be reduced to the order of 3000 microseconds, or 50 line intervals, by suitable choice of $K_1$ and $K_2$.

It will be noted that the effect of this operation of my control system is to provide a phase control circuit which operates rapidly to bring about phase accord between a received and a locally generated signal whenever the received signal is present and which maintains the last existent phase relation between these signals for a very long period should the received signal disappear temporarily or intermittently.

The embodiment of my invention shown in Figure 1 and heretofore described utilizes the average unidirectional output potential of a phase detector to control the long time average frequency of the local oscillator which forms an integral part of my synchronizing system. This particular arrangement was selected for initial description because it enabled me to describe the important relations between the various time constants of my system with reference to concrete circuit elements, namely the parallel R-C networks of the two phase detectors, thereby considerably simplifying the explanation.

It is well known, however, that there are other ways of controlling the long time average frequency of an oscillator. One such way is illustrated in the alternative embodiment of Figure 2 to which reference may now be had. In this alternative embodiment of my synchronizing system, the frequency control portion of my system as described in connection with Figure 1 has been replaced by a locked oscillator, constructed in accordance with certain important criteria hereinafter set forth in detail.

Note, first of all, that the phase control portion of the modified embodiment illustrated in Figure 2 remains exactly as it was in Figure 1, again comprising a phase detector 14 and a phase control circuit 15 whose individual components are all unchanged and whose criteria of construction and modes of operation remain exactly the same. The various components of the phase control portion of Figure 2 have therefore been designated by the same reference numerals as corresponding components of the embodiment of Figure 1.

The alternative embodiment of Figure 2 is also provided with a received signal source 10, which may be similar in every respect to the similarly designated component of Figure 1. In the case of a color burst synchronizing system, this received signal source 10 supplies previously isolated color bursts simultaneously to one input circuit of phase detector 14, as described in connection with Figure 1, and to the tank circuit 43 of an oscillator generally designated by reference numeral 44. This oscillator may take any one of numerous conventional forms. The particular one illustrated is a so-called Colpitts oscillator which is characterized by a tank circuit 43 having an inductance common to both the grid-to-cathode circuits and the anode-to-cathode circuits of oscillator tube 45. The output signal of this oscillator, whose operating characteristics are described in detail hereinafter, is developed across radio frequency choke 46 connected between the cathode of tube 45 and ground, whence it is supplied to phase detector 14, for phase comparison therein with the received signals derived from source 10. The detailed structure and mode of operation of this phase detector has already been described in detail with reference to the embodiment of Figure 1.

The general characteristics of locked oscillators such as illustrated in Figure 2 are well known. Briefly they rely on the tendency of an oscillator to change its operating frequency so as to approach the frequency of a signal current injected directly into its tank circuit. In Figure 2, this current injection is effected from received signal source 10 by way of a conventional buffer stage 47. This buffer stage prevents the locked oscillator output signal from reaching phase detector 14 by any path other than that provided by radio frequency choke 46 and transformer **16*a*. Note that, in the absence of the buffer stage, oscillator signals developed across tank circuit 43 would reach the phase detector also by way of choke 29*a*, thereby giving rise to a spurious unidirectional output potential from phase detector 14 even in the absence of received signal derived from source 10**.

In the operation of a locked oscillator, the amplitude of the injected signal is of great importance, since it determines the extent to which the oscillator frequency will approach the signal frequency, as well as the rapidity with which the approach takes place. Specifically, mathematical analysis confirmed by experiment reveals that the frequency differential between the normal operating frequency of the oscillator and the injected signal frequency, over which the injected signal will pull the oscillator operating frequency into synchronism with itself, increases with increasing signal amplitude. Furthermore, the rapidity with which this synchronization is effected also increases with increasing amplitude of the injected signal. Thus, if the amplitude of the injected signal is large, then a sudden change in frequency of this injected signal will cause the operating frequency of the locked oscillator to synchronize rapidly with the new value of the injected signal frequency. On the other hand, if the injected signal amplitude is small, and the injected signal frequency varies abruptly, the local oscillator frequency will change considerably more slowly in the direction of the changed signal frequency. It is thus possible to speak of the effective time constant of a locked oscillator, as being the time required for the locked oscillator signal to return to synchronism with the injected control signal after the frequency of the latter has been abruptly modified. Consequently the effective time constant of the locked oscillator is seen to increase as the injected signal amplitude decreases.

As has been explained, it is important that the local oscillator of my synchronizing system be responsive only to long time average frequency changes of the received signal. Consequently it is necessary that the effective time constant of locked oscillator 44, which operates as the local oscillator of the alternative embodiment of Figure 2 be long, as for example of the order of several complete picture intervals. Evidently, the circuits preceding the locked oscillator and which include buffer stage 47, determine the injected signal amplitude and with it, the time constant of the oscillator. They should therefore be arranged so that the received signal amplitude at the tank circuit is just barely sufficient to provide positive synchronism between the received signal and the local oscillator signal for any contemplated frequency variations in the average frequency of the received signal. The actual amplitude of the injected signal control current depends, of course, on the actual values of the various circuit components and voltages used in the locked oscillator and may readily be determined in a manner which will be obvious to those skilled in the art.

If the foregoing instructions are followed, there will be developed, across radio frequency choke 46, a continuous oscillation of long time average frequency equal to that of the long time average frequency of the received signal bursts, and similar in every respect to the local oscillator output signal developed across choke 29 of Figure 1. This signal is utilized in exactly the same manner as was the output signal from the local oscillator in Figure 1, being applied to identical phase detector and phase control circuits to produce a final output signal which corresponds to the received signal in long time average frequency as well as in more rapidly varying phase.

Summarizing then, a synchronizing system embodying my inventive concept comprises a frequency control portion which maintains the long time average frequency of a local oscillator substantially the same as that of a received signal in spite of intermittent absence of signal and in spite of noise. The locally generated signal derived from this oscillator is then at the proper average frequency but may be of the wrong instantaneous phase. The phase control portion of the system is provided to modify the phase of the locally generated signal in accordance with the instantaneous phase of the received signal, whose phase variations may occur at a considerably higher rate than its average frequency variations.

Note that noise components superimposed on the color burst occur at a still higher rate than these phase variations of the color burst itself. Thus, even though such noise components may combine with the desired signal to modify its apparent phase, the phase control portion will average out such spurious phase variations, while still responding to the slower, bona fide phase variations. The phase control portion is further characterized in that it maintains the phase of the locally generated signal substantially unchanged during relatively long intervals when the received signal is absent and that it is also substantially insensitive to noise in the received signal.

The frequency control portion of my system is characterized by having a local oscillator whose operating frequency is controlled, so as to be the same as the long time average frequency of the received signal, by a control circuit having an extremely long time constant of the order of several picture intervals.

This control circuit may comprise a phase detector having a long time constant output circuit as in the embodiment of Figure 1, or the long time constant control characteristic may be inherent in the cooperation between the oscillator itself and the received signal, as in the case of the locked oscillator embodiment of Figure 2. The phase control portion of the system, on the other hand, is characterized by the provision of a phase determining phase detector whose effective time constant differs in the presence and absence of the received signal, being of the order of magnitude of a few line periods of the received signal whenever the latter is present and being very much greater, perhaps of the order of several picture intervals, whenever the received signal is absent. The phase control portion of the system is further characterized by the provision of an impedance whose phase characteristic is determined by the phase determining phase detector associated therewith to produce phase changes in locally generated signals supplied to the aforesaid impedance directly and without the intermediate step of first producing frequency changes of the aforesaid locally generated signals.

It will be understood, from the foregoing discussion that the details of the particular types of phase detectors, frequency and phase control circuits and local oscillators used to illustrate in detail my inventive concept do not form an essential part of the invention, numerous other arrangements of these various components being equally well adapted for use in my system.

Synchronizing systems embodying my invention are, furthermore, adapted for a wide variety of specific applications with only the most routine modifications.

Thus, both of the systems herein illustrated and described, are equally useful in controlling the occurrence of locally generated sweep synchronizing pulses so as to insure their exact coincidence with corresponding received pulses. The only modification which need be made in either system to provide for such operation is in the time constants of the frequency and phase control networks which will naturally have to be different from what they were for the color sampling bursts to accommodate the different rate of occurrence of the synchronizing pulses.

In view of this wide scope of my inventive concept, I desire it to be limited only by the scope of the appended claims.

I claim:

1. In a synchronizing system adapted to be supplied with oscillatory signals of predetermined nominal frequency and comprising a local oscillator normally productive of signals of said nominal frequency: a frequency control circuit responsive to relatively slow departures of said oscillatory signal frequency from said nominal frequency to control said local oscillator so as to alter its signal frequency substantially in proportion to said relatively slow frequency departures; and a phase control circuit comprising a vacuum tube having at least cathode, anode and control grid electrodes, said control grid electrode being supplied with said signal from said oscillator, a load impedance in the anode-to-cathode circuit of said vacuum tube across which said signal is developed, said load impedance having controllable phase characteristic, and means responsive to relatively rapid changes in the phase of said supplied signal to control the phase characteristic of said load impedance so as to maintain the phase difference between said supplied signal and said oscillator signal developed across said load impedance substantially constant.

2. In a synchronizing system adapted to be supplied with an oscillatory signal of predetermined nominal frequency and comprising a local oscillator normally productive of signals at said nominal frequency; means for deriving from said oscillator a first signal at the frequency and phase with which it is produced by said oscillator; means responsive to the average difference in phase over a first period of predetermined duration between said derived signal and said supplied oscillatory signal to control said oscillator so as to alter the frequency of the signals produced by said oscillator in proportion to said average phase difference; means for deriving a second signal from said oscillator; means responsive to the average difference in phase between said second derived signal and said supplied oscillatory signal over a second period of predetermined duration but shorter than said first period to shift the phase of said second derived signal by an amount substantially proportional to said last-named average phase difference; and means for isolating said phase shifting means from said oscillator so that said phase shifting means has substantially no effect on the frequency and phase with which signals are produced by said oscillator.

3. The system of claim 2 further characterized in that said oscillatory signal is intermittent and in that each of said periods of predetermined duration extends over several periods of recurrence of said intermittent oscillatory signal.

4. In a synchronizing system adapted to be supplied with a received signal of predetermined nominal frequency which is subject to slow average frequency changes, to more rapid phase changes and to still more rapid amplitude changes due to noise, said system comprising a local oscillator normally productive of signals of said nominal frequency: means for deriving from said oscillator a first signal at the frequency and phase with which it is produced by said oscillator; means responsive to the average difference in phase over a period of said slow average frequency changes between said derived signal and said received signal to control said oscillator so as to alter the frequency of the signals produced by said oscillator in proportion to said average phase difference; means for deriving a second signal from said oscillator; means responsive to the average difference in phase over a period of said more rapid phase changes between said second derived signal and said received signal to shift the phase of said second derived signal by an amount substantially proportional to said last-named average phase difference; and means for isolating said phase shifting means from said oscillator so that said phase shifting means has substantially no effect on the frequency and phase with which signals are produced by said oscillator.

5. The system of claim 4 further characterized in that both said means to control said oscillator and said phase shifting means are non-responsive to amplitude changes of the periodicity of said still more rapid amplitude changes due to noise to change either the frequency or the phase of signals derived from said oscillator.

6. In a synchronizing system adapted to be supplied with an oscillatory signal of predetermined nominal frequency and comprising a local oscillator normally productive of signals at said nominal frequency: means for deriving from said oscillator a first signal at the frequency and phase with which it is produced by said oscillator; means for developing a signal substantially proportional to the instantaneous difference in phase between said derived signal and said supplied oscillatory signal; means responsive to said developed signal for producing a first control signal whose instantaneous value is substantially equal to the average value of said developed signal over a period of first predetermined finite duration; means responsive to said first control signal for controlling said oscillator so as to alter the frequency of the signals produced by said oscillator in proportion to the magnitude of said first control signal; means for deriving a second signal from said oscillator; means responsive to the instantaneous difference in phase between said second derived signal and said supplied oscillatory signal to produce a second control signal whose instantaneous value is substantially equal to the average value of said instantaneous difference in phase over a period of second predetermined finite duration but much shorter than said period of first predetermined duration; means responsive to said second control signal to shift the phase of said second derived signal by an amount substantially proportional to the magnitude of said second control signal; and means for isolating said phase shifting means from said oscillator so that said phase shifting means has substantially no effect on the frequency and phase with which signals are produced by said oscillator.

7. In a synchronizing system adapted to be supplied with an oscillatory signal of predetermined nominal frequency and comprising a local oscillator normally productive of signals at said nominal frequency; means for deriving from said oscillator a first signal at the frequency and phase with which it is produced by said oscillator; means responsive to the average difference in phase over a first period of predetermined duration between said derived signal and said supplied oscillatory signal to control said oscillator so as to alter the frequency of the signals produced by said oscillator in proportion to said average phase difference; means for deriving a second signal from said oscillator; a reactance device responsive to a control signal to vary its reactance and operative to shift the phase of a signal applied thereto in proportion to its reactance; means for supplying said second signal to said reactance device; a phase detector; means for supplying the output signal from said reactance device and said supplied oscillatory signal to said phase detector; means for supplying the output signal from said phase detector to said reactance device as a control signal; and means for isolating said reactance device from said oscillator so that variations in the reactance of said device have substantially no effect on the frequency and phase with which signals are produced by said oscillator.

8. The system of claim 7 further characterized in that said phase detector has an output circuit including an energy storage device, said phase detector being responsive to the signals supplied thereto to develop an output potential across said energy storage device which is proportional to the average phase difference between said last-named signal over a predetermined short time interval, and said energy storage device being operative to maintain the potential thereacross substantially constant over a time interval many times longer than said short time interval in the absence of a developed output potential from said phase detector.

References Cited in the file of this patent

UNITED STATES PATENTS

| | | |
|---|---|---|
| 1,926,169 | Nyquist | Sept. 12, 1933 |
| 2,435,259 | Wilder et al. | Feb. 3, 1948 |
| 2,503,700 | Barco | Apr. 11, 1950 |
| 2,610,297 | Leed | Sept. 9, 1952 |